US012518480B2

(12) United States Patent
Carlson et al.

(10) Patent No.: US 12,518,480 B2
(45) Date of Patent: Jan. 6, 2026

(54) NEURAL RADIANCE FIELD FOR VEHICLE (71) Applicants: Ford Global Technologies, LLC, Dearborn, MI (US); THE REGENTS OF THE UNIVERSITY OF MICHIGAN, Ann Arbor, MI (US)

(72) Inventors: Alexandra Carlson, Palo Alto, CA (US); Nikita Jaipuria, Pittsburgh, PA (US); Punarjay Chakravarty, Campbell, CA (US); Manikandasriram Srinivasan Ramanagopal, Pittsburgh, PA (US); Ramanarayan Vasudevan, Ann Arbor, MI (US); Katherine Skinner, Ann Arbor, MI (US)

(73) Assignees: Ford Global Technologies, LLC, Dearborn, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 250 days.

(21) Appl. No.: 18/358,438

(22) Filed: Jul. 25, 2023

(65) Prior Publication Data
US 2024/0046563 A1 Feb. 8, 2024

Related U.S. Application Data (60) Provisional application No. 63/370,304, filed on Aug. 3, 2022.

(51) Int. Cl.
*G06T 15/06* (2011.01)
*G06T 7/521* (2017.01)
(Continued)

(52) U.S. Cl.
CPC .............. *G06T 17/00* (2013.01); *G06T 7/521* (2017.01); *G06T 7/90* (2017.01); *G06T 15/06* (2013.01);
(Continued)

(58) Field of Classification Search
CPC ........... G06T 15/06; G06T 2207/20084; G06T 17/00; G06T 2207/20081; G06T 7/90;
(Continued)

(56) References Cited

U.S. PATENT DOCUMENTS

2022/0191561 A1 6/2022 Hinds et al.
2022/0201055 A1 6/2022 Hinds et al.
(Continued)

FOREIGN PATENT DOCUMENTS

DE 102021002798 A1 7/2021
WO 2021247038 A1 12/2021

OTHER PUBLICATIONS

Derksen, D., "Shadow Neural Radiance Fields for Multi-view Satellite Photogrammetry," arXiv:2104.09877v1 [cs.CV] Apr. 20, 2021, 10 pages.

*Primary Examiner* — Hau H Nguyen
(74) *Attorney, Agent, or Firm* — Frank A. MacKenzie; Brooks Kushman P.C.

(57) ABSTRACT

A computer includes a processor and a memory, and the memory stores instructions executable by the processor to jointly train a geometric NeRF multilayer perceptron (MLP) and a color NeRF MLP to model a scene using an occupancy grid map, camera data of the scene from a camera, and lidar data of the scene from a lidar; supervise the geometric NeRF MLP with the lidar data during the joint training; and supervise the color NeRF MLP with the camera data during the joint training. The geometric NeRF MLP is a neural radiance field modeling a geometry of the scene, and the color NeRF MLP is a neural radiance field modeling colors of the scene.

20 Claims, 7 Drawing Sheets (51) Int. Cl.
*G06T 7/90* (2017.01)
*G06T 17/00* (2006.01)
(52) U.S. Cl.
CPC ............... *G06T 2207/10024* (2013.01); *G06T 2207/10028* (2013.01); *G06T 2207/20081* (2013.01); *G06T 2207/20084* (2013.01); *G06T 2207/30252* (2013.01); *G06T 2210/61* (2013.01)
(58) Field of Classification Search
CPC ........... G06T 2207/10024; G06T 2207/10028; G06T 2207/30252; G06T 2210/61
See application file for complete search history.

(56) References Cited

U.S. PATENT DOCUMENTS

| | | | |
|---|---|---|---|
| 2022/0239844 A1* | 7/2022 | Lv | G06T 15/205 |
| 2023/0377180 A1* | 11/2023 | Ambrus | G06T 15/20 |
| 2023/0401815 A1* | 12/2023 | Liu | G06V 10/56 |

\* cited by examiner

FIG. 7C

NEURAL RADIANCE FIELD FOR VEHICLE

CROSS-REFERENCE TO RELATED APPLICATION

This application claims priority to provisional U.S. Patent Appl. No. 63/370,304, filed on Aug. 3, 2022, which is hereby incorporated by reference in its entirety.

BACKGROUND

Modern vehicles typically include a variety of sensors. Some sensors detect the external world, e.g., objects and/or characteristics of surroundings of the vehicles, such as other vehicles, road lane markings, traffic lights and/or signs, pedestrians, etc. Types of sensors for vehicles include radar sensors, ultrasonic sensors, scanning laser range finders, light detection and ranging (lidar) devices, and image processing sensors such as cameras.

BRIEF DESCRIPTION OF THE DRAWINGS

FIG. 2 is a diagram of a portion of an occupancy grid with a ray from a sensor passing through.

DETAILED DESCRIPTION

This disclosure describes techniques to model a scene geometrically and visually. The scene is modeled using distinct neural radiance field (NeRF) multilayer perceptrons (MLP), a geometric NeRF MLP and a color NeRF MLP, as well as an occupancy grid map. The geometric NeRF MLP is a neural radiance field modeling a geometry of the scene, and the color NeRF MLP is a neural radiance field modeling colors of the scene. A neural radiance field is a neural network, in this case a multilayer perceptron, trained to implicitly represent a specific scene. The scene is also modeled with an occupancy grid map. An occupancy grid map is a representation of a three-dimensional scene as a grid, with each point in the grid being a variable indicating whether that point is occupied (i.e., filled by an object) or unoccupied (i.e., empty space). A computer is programmed to jointly train the geometric NeRF MLP and the color NeRF MLP to model the scene using the occupancy grid map, camera data of the scene from a camera, and lidar data of the scene from a lidar; supervise the geometric NeRF MLP with the lidar data during the joint training; and supervise the color NeRF MLP with the camera data during the joint training. Supervising the geometric NeRF MLP with lidar data can help prevent sensor artifacts and illumination effects in the camera data from affecting the geometric NeRF MLP. The use of the occupancy grid map can provide better performance than a coarse MLP, which is typically used for NeRFs, especially for large outdoor scenes. The techniques herein can provide a dense, accurate model of a scene from sparse data, e.g., from a single camera image and a single lidar scan—something that NeRFs have previously had difficulty doing for large outdoor scenes. For example, these techniques may be useful for a vehicle that has just turned on. Because the vehicle has not been moving through the environment with the camera and lidar gathering data, the available data may be limited to camera data and lidar data captured while the vehicle including the camera and lidar is stationary. Despite the limited data, these techniques can provide an accurate representation of the scene for the vehicle to begin traveling through the scene.

A computer includes a processor and a memory, and the memory stores instructions executable by the processor to jointly train a geometric NeRF multilayer perceptron (MLP) and a color NeRF MLP to model a scene using an occupancy grid map, camera data of the scene from a camera, and lidar data of the scene from a lidar; supervise the geometric NeRF MLP with the lidar data during the joint training; and supervise the color NeRF MLP with the camera data during the joint training. The geometric NeRF MLP is a neural radiance field modeling a geometry of the scene, and the color NeRF MLP is a neural radiance field modeling colors of the scene.

In an example, the instructions may further include instructions to, after the joint training, actuate a component based on at least one of the occupancy grid map, the geometric NeRF MLP, or the color NeRF MLP.

In an example, the instructions may further include instructions to sample occupancy of the occupancy grid map at points along a ray extending from the camera or lidar. In a further example, the instructions may further include instructions to sample the occupancy at the points by interpolating from occupancy values at nearby grid points of the occupancy grid map.

In another further example, the points may be first points, the first points may be evenly spaced along the ray, and the instructions may further include instructions to perform importance sampling of occupancy of the occupancy grid map at second points along the ray. In a yet further example, the instructions may further include instructions to execute at least one of the geometric NeRF MLP or the color NeRF MLP with positions of the second points as an input.

In an example, the instructions may further include instructions to render at least one of a lidar ray extending from the lidar by executing the geometric NeRF MLP or a camera ray extending from the camera by executing the color NeRF MLP.

In an example, the instructions may further include instructions to update the geometric NeRF MLP based on a loss function. In a further example, the loss function may include an opacity loss based on an opacity along a ray extending from the lidar.

In another further example, the loss function may include a line-of-sight loss along a ray extending from the lidar. In a yet further example, the loss function may include an opacity loss based on an opacity along the ray, and the line-of-sight loss may be weighted more strongly in the loss function than the opacity loss is.

In an example, the instructions may further include instructions to update the color NeRF MLP based on a loss function. In a further example, the loss function may include an opacity loss based on an opacity along a ray extending from the camera.

In another further example, the loss function may include a color loss along a ray extending from the camera.

In an example, the instructions may further include instructions to update the occupancy grid map using stochastic gradient descent based on the lidar data.

In an example, the instructions may further include instructions to update the occupancy grid map concurrently with training the geometric NeRF MLP and color NeRF MLP.

In an example, the instructions may further include instructions to update the occupancy grid map, and, during the joint training, update the geometric NeRF MLP or the color NeRF MLP multiple times for each update of the occupancy grid map.

In an example, the instructions may further include instructions to, before jointly training the geometric NeRF MLP and the color NeRF MLP, train the geometric NeRF MLP independent of the color NeRF MLP.

In an example, the instructions may further include instructions to, before jointly training the geometric NeRF MLP and the color NeRF MLP, train the color NeRF MLP independent of the geometric NeRF MLP.

A method includes jointly training a geometric NeRF multilayer perceptron (MLP) and a color NeRF MLP to model a scene using an occupancy grid map, camera data of the scene from a camera, and lidar data of the scene from a lidar; supervising the geometric NeRF MLP with the lidar data during the joint training; and supervising the color NeRF MLP with the camera data during the joint training. The geometric NeRF MLP is a neural radiance field modeling a geometry of the scene, and the color NeRF MLP is a neural radiance field modeling colors of the scene.

Figure 1:
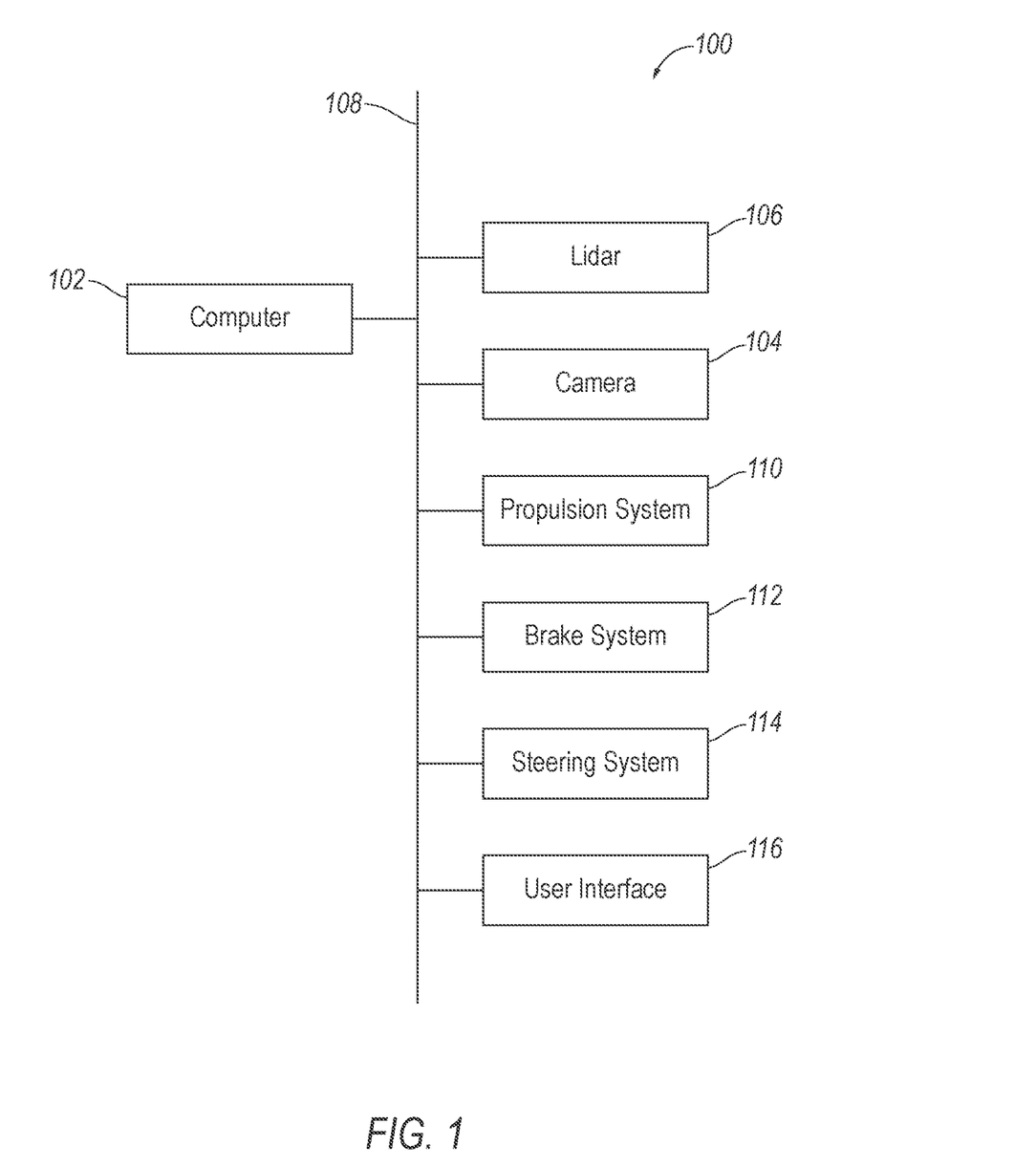
FIG. 1 is a block diagram of an example vehicle.
Figure 2:
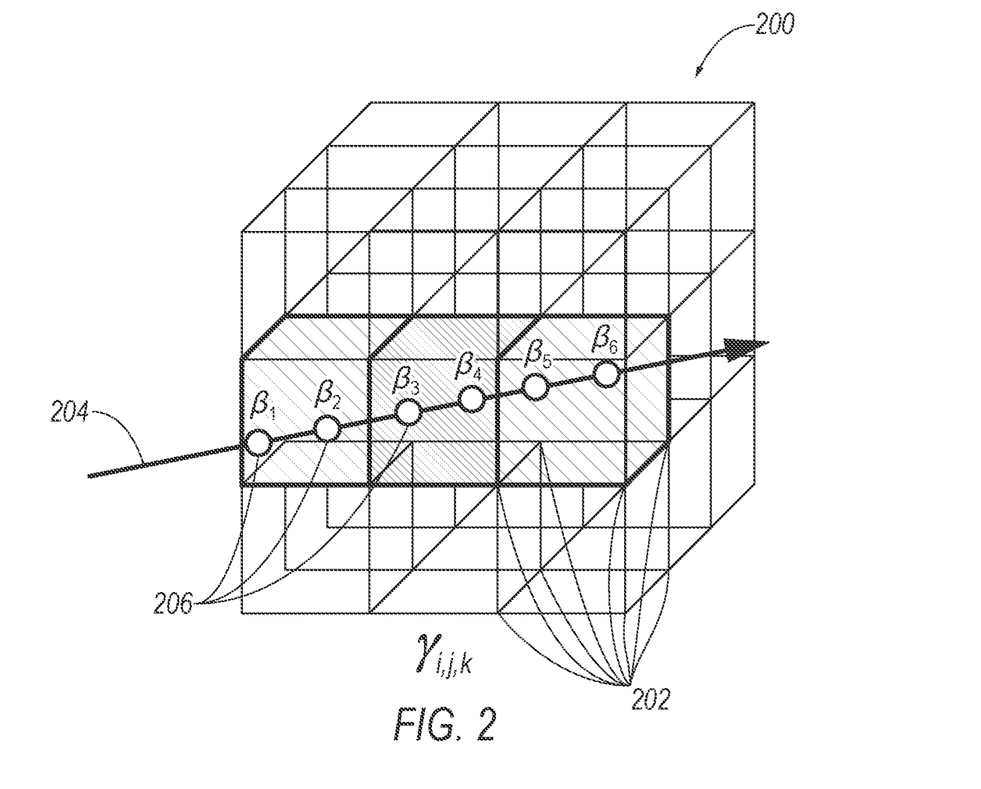

With reference to the Figures, wherein like numerals indicate like parts throughout the several views, a computer 102 of a vehicle 100 includes a processor and a memory, and the memory stores instructions executable by the processor to jointly train a geometric NeRF multilayer perceptron (MLP) and a color NeRF MLP to model a scene using an occupancy grid map 200, camera data of the scene from a camera 104, and lidar data of the scene from a lidar 106; supervise the geometric NeRF MLP with the lidar data during the joint training; and supervise the color NeRF MLP with the camera data during the joint training. The geometric NeRF MLP is a neural radiance field modeling a geometry of the scene, and the color NeRF MLP is a neural radiance field modeling colors of the scene.

With reference to FIG. 1, the vehicle 100 may be any passenger or commercial automobile such as a car, a truck, a sport utility vehicle, a crossover, a van, a minivan, a taxi, a bus, etc. The vehicle 100 may include the computer 102, a communications network 108, the lidar 106, the camera 104, a propulsion system 110, a brake system 112, a steering system 114, and a user interface 116.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through the communications network 108. The communications network 108 may be, e.g., a controller area network (CAN) bus, Ethernet, WiFi, Local Interconnect Network (LIN), onboard diagnostics connector (OBD-II), and/or any other wired or wireless communications network. The computer 102 may be communicatively coupled to the lidar 106, the camera 104, the propulsion system 110, the brake system 112, the steering system 114, the user interface 116, and other components via the communications network 108.

The lidar 106, e.g., a scanning lidar device, detects distances to objects by emitting laser pulses at a particular wavelength and measuring the time of flight for the pulse to travel to the object and back. The lidar 106 can be any suitable type for providing the lidar data on which the computer 102 can act, e.g., spindle-type lidar, solid-state lidar, flash lidar, etc.

The computer 102 is programmed to receive lidar data from the lidar 106. The lidar data may be, e.g., a point cloud. One point cloud may be generated for each scan, i.e., for each full revolution of the lidar 106. The points of the point cloud specify respective positions in the scene. Each point in the point cloud can define a ray 204 extending from the lidar 106. The points may be represented in a world coordinate system, i.e., a coordinate system relative to the scene rather than to the vehicle 100. The origin of the ray 204 may be given by the following equation:

$$\vec{o} = H_L [0\ 0\ 0\ 1]$$

in which $H_L$ is the pose of the lidar 106 in world coordinates. The direction of the ray 204 may be given by the following equation:

$$\vec{d} = H_L [\vec{x}^T 1] - \vec{o}$$

in which $\vec{x}$ is the point in a coordinate system relative to the lidar 106.

The camera 104 can detect electromagnetic radiation in some range of wavelengths. For example, the camera 104 may detect visible light, infrared radiation, ultraviolet light, or some range of wavelengths including visible, infrared, and/or ultraviolet light. For example, the camera 104 can be a charge-coupled device (CCD), complementary metal oxide semiconductor (CMOS), or any other suitable type.

The computer 102 is programmed to receive camera data from the camera 104. The camera data are one or more image frames of the field of view of the camera 104. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the sensor at the time that the image frame was recorded, can be specified in pixel dimensions or coordinates, e.g., an ordered pair of pixel distances (u, v), such as a number of pixels from a top edge and a number of pixels from a left edge of the image frame.

The propulsion system 110 of the vehicle 100 generates energy and translates the energy into motion of the vehicle 100. The propulsion system 110 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 110 can include an electronic control unit (ECU) or the like that is in communication with and receives input from the computer 102 and/or a human operator. The human operator may control the propulsion system 110 via, e.g., an accelerator pedal and/or a gear-shift lever.

The brake system 112 is typically a conventional vehicle braking subsystem and resists the motion of the vehicle 100 to thereby slow and/or stop the vehicle 100. The brake system 112 may include friction brakes such as disc brakes, drum brakes, band brakes, etc.; regenerative brakes; any other suitable type of brakes; or a combination. The brake system 112 can include an electronic control unit (ECU) or the like that is in communication with and receives input from the computer 102 and/or a human operator. The human operator may control the brake system 112 via, e.g., a brake pedal.

The steering system 114 is typically a conventional vehicle steering subsystem and controls the turning of the wheels. The steering system 114 may be a rack-and-pinion system with electric power-assisted steering, a steer-by-wire system, as both are known, or any other suitable system. The steering system 114 can include an electronic control unit (ECU) or the like that is in communication with and receives input from the computer 102 and/or a human operator. The human operator may control the steering system 114 via, e.g., a steering wheel.

The user interface 116 presents information to and receives information from an operator of the vehicle 100. The user interface 116 may be located, e.g., on an instrument panel in a passenger compartment of the vehicle 100, or wherever may be readily seen by the operator. The user interface 116 may include dials, digital readouts, screens, speakers, and so on for providing information to the operator, e.g., human-machine interface (HMI) elements such as are known. The user interface 116 may include buttons, knobs, keypads, microphone, and so on for receiving information from the operator.

With reference to FIG. 2, the techniques below use the occupancy grid map 200 of the scene. An occupancy grid map is a representation of a three-dimensional scene as a grid, with each grid point 202 having an occupancy value $\gamma_{i,j,k}$ indicating whether that grid point 202 is occupied (i.e., filled by an object) or unoccupied (i.e., empty space). The grid points 202 may be evenly distributed along three mutually orthogonal axes, with the indices i, j, and k of a grid point 202 representing the positions along each axis. The occupancy value $\gamma_{i,j,k}$ indicates a probability that the grid point 202 (i, j, k) is occupied and can range from zero to one.

The computer 102 may be programmed to initialize the occupancy grid map 200, e.g., in response to the vehicle 100 turning on. "Initializing" the occupancy grid map 200 refers to creating the occupancy grid map 200 in an initial state, e.g., without the benefit of previous states of the occupancy grid map 200. As will be described below, the occupancy grid map 200 may be updated after initialization. For example, the computer 102 may generate the occupancy grid map 200 in a default state, e.g., with the occupancy values having initial values of zero. For another example, the computer 102 may generate the occupancy grid map 200 based on the lidar data. Each occupancy value can be set to one if the lidar data include a point at the respective grid point 202 (or closer to that grid point 202 than to any other grid point 202) and zero otherwise.

Figure 5:
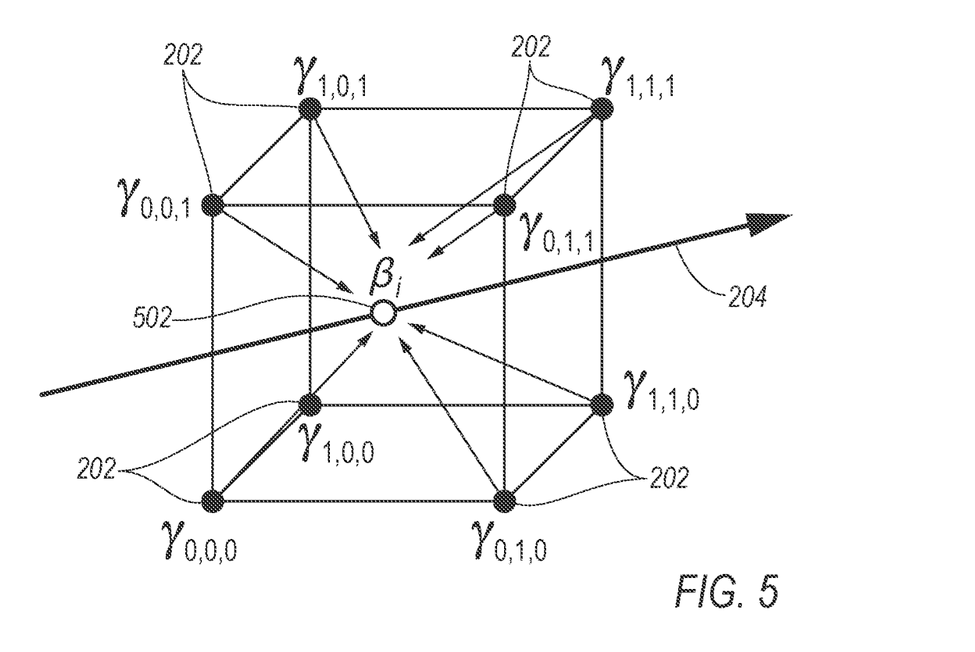
FIG. 5 is a diagram of interpolation of an occupancy value at a sample point from points in the occupancy grid.

The computer 102 may be programmed to sample occupancy of the occupancy grid map 200 at sample points 206, 302 along a ray 204 extending from the camera 104 or lidar 106. This sampling may occur after initialization or after updating of the occupancy grid map 200. The computer 102 may sample the occupancy at the sample points 206, 302 by interpolating from occupancy values at nearby grid points 202 of the occupancy grid map 200. For example, the sampled occupancy value $\beta_l$ at a point along the ray 204 with index l may be calculated as a mean of the occupancy values $\gamma_{i,j,k}$ for the eight surrounding grid points 202, e.g., weighted by closeness to the sample point 206, 302, as illustrated in FIG. 5.

The sampling may occur in two stages, with the occupancy of first points 206 sampled in a first stage and the occupancy of second points 302 sampled in a second stage. Determining the occupancy for each sample point 206, 302 may be performed in the same manner as described immediately above. In the first stage, the first points 206 may be evenly spaced along the ray 204.

Figure 3:
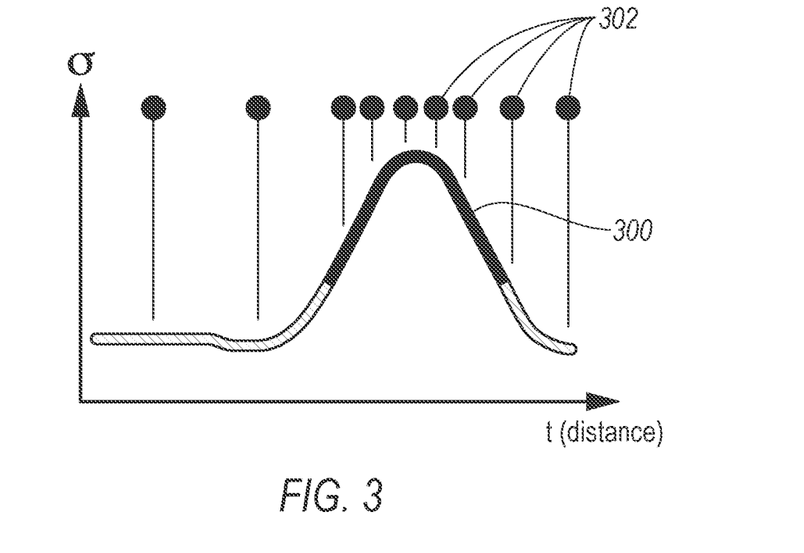
FIG. 3 is a plot of importance sampling from the occupancy grid along the ray.

With reference to FIG. 3, in the second stage, the computer 102 may perform importance sampling of occupancy of the occupancy grid map 200 at the second points 302 along the ray 204. Importance sampling is a Monte Carlo method involving randomly sampling from a different distribution than the distribution of interest, with the different distribution chosen to approximate a random variable equal to one at the expected value of the distribution of interest and zero otherwise. The frequencies of samples may be sorted according to their weights in determining the expected value of the distribution of interest. FIG. 3 is a plot of a curve 300 fitted to the occupancy values sampled from the first points 206 versus distance along the ray 204. The importance sampling redistributes the locations of the second points 302 compared to the first points 206 to be unevenly distributed along the ray 204, as shown by the locations of the second points 302 along the length of the ray 204. Specifically, the importance sampling gives the second points 302 a higher linear density along the ray 204 close to occupied regions of the grid map and lower linear density in unoccupied regions.

Figure 4:
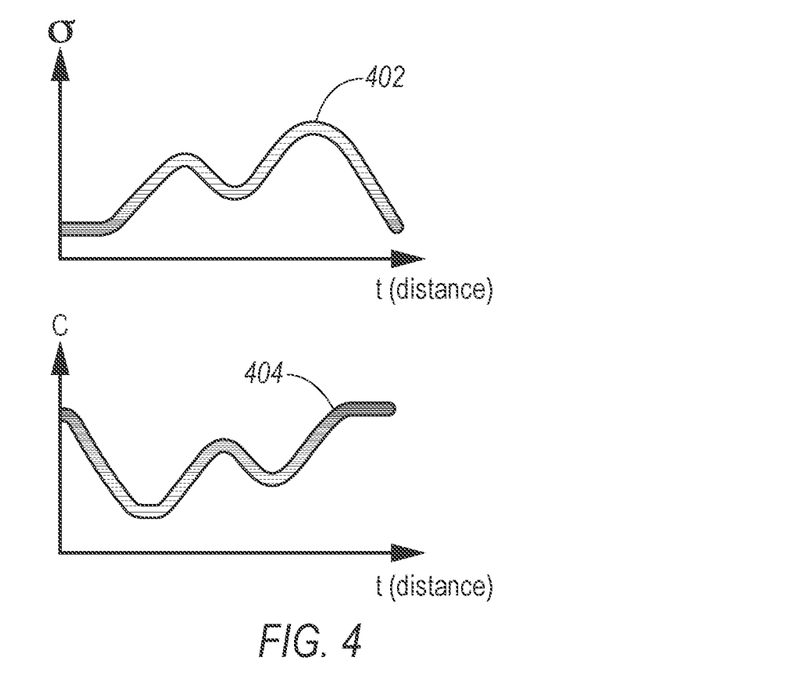
FIG. 4 is two plots of color and depth, respectively, along the ray.

With reference to FIG. 4, a neural radiance field (NeRF) is a neural network trained to implicitly represent a specific scene. Once a NeRF is trained on a scene, the NeRF can be used to generate new views of the scene from perspectives that were not included in the training data. Conventionally, the training data is solely a plurality of images of a scene, and a trained NeRF takes a three-dimensional location $\vec{x}=(x, y, z)$ and a viewing direction $\vec{d}=(x_d, y_d, z_d)$ as inputs and outputs a scalar volume density $\sigma$ at that location and the color $\vec{c}=(r, g, b)$ emitted at that location toward the viewing direction. A NeRF is trained for a specific scene. If a different scene is of interest, then a new NeRF will need to be trained.

The geometric NeRF MLP and the color NeRF MLP are multilayer perceptrons (MLP). An MLP is a fully connected feedforward artificial neural network. Each MLP includes an input layer, at least one hidden layer, and an output layer. The layers are made of nodes. The nodes in each layer receive as inputs the outputs from the nodes in the previous layer, starting with the input layer and ending with the output layer. Each connection between nodes in adjacent layers has a weight. Each node has an activation function that takes as its argument the weighted inputs to that node. MLPs are fully connected in that each node in one layer is connected to each node in the adjacent layer(s). Training an MLP results in changing the weights via backpropagation.

The techniques herein use distinct NeRF MLPs for geometry and color rather than a single NeRF for both. The geometric NeRF MLP is a neural radiance field modeling a geometry of the scene. Once trained, the geometric NeRF MLP receives a three-dimensional location as input and generates the scalar volume density at that location as output. The color NeRF MLP is a neural radiance field modeling colors of the scene. Once trained, the color NeRF MLP receives a three-dimensional location and a viewing direction as input and generates the color emitted at that location toward the viewing direction. The geometric NeRF MLP and the color NeRF MLP do not have any interacting terms, i.e., there are no connections from nodes in one of the NeRF MLPs to nodes in the other of the NeRF MLPs. The use of distinct NeRF MLPs for geometry and color permits supervision of the geometric output (e.g., the scalar volume density) by the lidar data, meaning that much less camera data is needed, e.g., only a single image.

The computer 102 may be programmed to both independently and jointly train the geometric NeRF MLP and the color NeRF MLP. For example, before jointly training the geometric NeRF MLP and the color NeRF MLP, the computer 102 may train the geometric NeRF MLP independent of the color NeRF MLP and may train the color NeRF MLP independent of the geometric NeRF MLP. The computer 102 may then jointly train the geometric NeRF MLP and the color NeRF MLP to model the scene. Independent training permits the geometric NeRF MLP and the color NeRF MLP to coarsely model the scene, and the joint training fine-tunes the scene modeling.

The computer 102 trains the geometric NeRF MLP and the color NeRF MLP using the occupancy grid map 200, the camera data, and the lidar data. The computer 102 trains the geometric NeRF MLP, the color NeRF MLP, and both the geometric NeRF MLP and the color NeRF MLP in distinct stages. In each stage, the computer 102 executes the geometric NeRF MLP to render a lidar ray 204 or the color NeRF MLP to render a camera ray 204, calculates a loss function comparing the rendered ray 204 with a ground-truth value from the lidar data or camera data, and updates the geometric NeRF MLP or color NeRF MLP based on the loss function, as will be described in turn.

The computer 102 is programmed to render a lidar ray 204 extending from the lidar by executing the geometric NeRF MLP to output the scalar volume density at points along the lidar ray 204. FIG. 4 shows a first curve 402 plotting the scalar volume density versus distance along the ray 204. The positions of the second points 302 from the importance sampling above may be inputted to the geometric NeRF MLP as the positions of the points for which the scalar volume density is outputted. For example, the computer 102 may determine an expected termination depth of the lidar ray 204. The expected termination depth is the expected distance to a corresponding point of a point cloud from the lidar 106. The computer 102 may determine the expected termination depth by summing or integrating terms for the second points 302, the terms depending on the scalar volume density and distance between second points 302, e.g., exponential of a product of the scalar volume density and the distance between consecutive second points 302, e.g., a quadrature approximation of a volumetric rendering equation, as in the following expression:

$$\hat{D}(\vec{r}) = \sum_{i=1}^{N} \exp\left(-\sum_{j=1}^{i-1} \sigma_j \delta_j\right)(1 - \exp(-\sigma_i \delta_i) t_i)$$

in which $\hat{D}$ is the expected termination depth, $\vec{r}$ is the ray 204, i and j are indexes of the second points 302, N is the total number of second points 302 along the ray 204, exp( ) is the exponential function, i.e., Euler's number e raised to the power of the argument, $\sigma_i$ is the scalar volume density at point i, $\delta_i$ is the distance between points i and i+1, and $t_i$ is the distance from the origin of the ray 204 to the point i. The ray 204 is the sum of the origin of the ray 204 and the distance from the origin and a unit vector of the direction of the ray 204, i.e., $\vec{r}(t) = \vec{o} + t\vec{d}$, in which $\vec{o}$ is the origin of the ray 204 and $\vec{d}$ is the unit vector direction of the ray 204. The scalar volume density $\sigma_i$ is the output of the geometric NeRF MLP for inputs of the position of the second point 302 i. The distances between the second points 302 can be represented as the difference between the distances from the origin to one second point 302 and to the next second point 302, i.e., $\delta_i = t_{i+1} - t_i$. Because of the importance sampling described above, the distances between the second points 302 are different along the ray 204.

The computer 102 is programmed to render a camera ray 204 extending from the camera 104 by executing the color NeRF MLP to output the color seen looking toward the viewing direction at each second point 302 along the camera ray 204. FIG. 4 shows a second curve 404 plotting the color seen in the viewing direction versus distance along the ray 204. The computer 102 may also execute the geometric NeRF MLP to output the scalar volume density at the corresponding points along the camera ray 204 for rendering the camera ray 204. The positions of the second points 302 from the importance sampling above may be inputted to the color NeRF MLP and the geometric NeRF MLP as the positions for which the colors and scalar volume density are outputted. For example, the computer 102 may determine an expected color of the camera ray 204 by summing or integrating color terms for the second points 302, the terms weighted based on the scalar volume density and distance between second points 302, e.g., based on an exponential of a product of the scalar volume density and the distance between consecutive second points 302, e.g., a quadrature approximation of a volumetric rendering equation, as in the following expression:

$$\hat{\vec{C}}(\vec{r}) = \sum_{i=1}^{N} \exp\left(-\sum_{j=1}^{i-1} \sigma_j \delta_j\right)(1 - \exp(-\sigma_i \delta_i) \vec{c}_i)$$

in which $\hat{\vec{C}}$ is the expected color of the camera ray 204, and $\vec{c}_i$ is the color at the point i in the viewing direction $\vec{d}$. The expected color $\hat{\vec{C}}$ is the expected color of a corresponding pixel (u, v) of an image from the camera 104. The color $\vec{c}_i$ is the output of the color NeRF MLP for inputs of the position of second point 302 i and the direction of the ray 204, e.g., the unit vector $\vec{d}$.

The computer 102 may be programmed to calculate a loss function comparing the rendered rays 204 with ground-truth sensor data from the camera 104 and lidar 106. The computer 102 uses the loss functions to supervise the geometric NeRF MLP with the lidar data and to supervise the color NeRF MLP with the color data as well as with the lidar data during the training. The loss function may include an opacity loss based on an opacity along a ray 204 extending from the camera 104 or lidar 106, a line-of-sight loss along a ray 204 extending from the lidar 106, and/or a color loss along a ray 204 extending from the camera 104.

The loss function may include the opacity loss along a ray 204 extending from the lidar 106 or the camera 104. An opacity loss may use a penalty method to force the accumulated opacities to sum to one along the ray 204. For example, the opacity loss may include the difference between one and a sum of accumulated opacities along the ray 204, e.g., as in the following expression:

$$\mathcal{L}_{opacity}(\Theta) = \left\| 1 - \sum_i w_i \right\|$$

in which $\Theta$ represents the weights in the geometric NeRF MLP, i is an index of the second points 302 along the ray 204, and $w_i$ is the accumulated opacity at the second point 302 i.

The loss function may include the line-of-sight loss along a lidar ray 204 extending from the lidar 106. The line-of-sight loss may include a difference between the accumulated opacity and a ground-truth accumulated opacity at each second point 302, e.g., as in the following expression:

$$\mathcal{L}_{sight}(\Theta) = \|w_i - w^*_i\|_1$$

in which $w_i^*$ is the ground-truth accumulated opacity at the second point 302 i, and the subscript 1 represents an L1 penalty. An L1 penalty is used to encourage the accumulated opacity $w_i$ to be nonzero at one point and zero everywhere else. The ground-truth accumulated opacity is based on a ground-truth termination depth from the lidar data, e.g., as in the following expression:

$$w^*_i = \mathcal{K}_\epsilon(t_i - z^*)$$

in which $\mathcal{K}_\epsilon$ is a truncated Gaussian distribution with variance equal to $(\epsilon/3)^2$ and $\epsilon$ is a nonzero number that is decayed as training progresses.

The loss function includes the color loss along a camera ray 204 extending from the camera 104. The color loss may include a difference between the expected color of the camera ray 204 and the ground-truth color of the camera ray 204 (i.e., of the corresponding pixel (u, v) from the camera data), e.g., as in the following expression:

$$\mathcal{L}_{color}(\Phi) = \|\hat{C}(\vec{r}) - C(\vec{r})\|_1$$

in which $\Phi$ represents the weights in the color NeRF MLP, $\hat{C}(\vec{r})$ is the expected color of the ray 204 $\vec{r}$, $C(\vec{r})$ is the color of the pixel (u, v) of camera data corresponding to the ray 204 $\vec{r}$, and the subscript 1 represents an L1 penalty. The camera rays 204 may include rays 204 located between pixels in the camera data, e.g., with fractional pixel coordinates in the image frame. In that case, the ground-truth color may be determined with bilinear interpolation of the adjacent pixels.

The computer 102 may use the opacity loss for a ray 204 from the lidar 106 and the line-of-sight loss to supervise the geometric NeRF MLP with the lidar data during independent training. The computer 102 may use the opacity loss for the ray 204 from the camera 104 and the color loss to supervise the color NeRF MLP with the camera data during independent training. The computer 102 may use the opacity loss, the line-of-sight loss, and the color loss to supervise the geometric NeRF MLP and the color NeRF MLP with the lidar data and camera data during joint training. For example, the computer 102 may calculate the loss function as a sum of the opacity loss, the line-of-sight loss, and the color loss, e.g., with the terms weighted, e.g., as in the following expression:

$$\mathcal{L}_{(\Theta,\Phi)} = \mathcal{L}_{opacity}(\Theta) + \lambda_1 \mathcal{L}_{sight}(\Theta) + \lambda_2 \mathcal{L}_{color}(\Phi)$$

in which $\lambda_1$ and $\lambda_2$ are weights. The weights may be chosen to maintain accuracy while encouraging convergence within a reasonable time for subsequent actions to be taken. The line-of-sight loss may be weighted more strongly in the loss function than the opacity loss is. The weight $\lambda_1$ for the line-of-sight loss may be decayed over the course of the training. The color loss may be weighted more strongly in the loss function than the opacity loss is. These relative weights are based on relative importance for accuracy of the geometric NeRF MLP or color NeRF MLP.

The computer 102 is programmed to update the geometric NeRF MLP and/or the color NeRF MLP based on the loss function. For example, the weights $\Theta$, $\Phi$ of the geometric NeRF MLP and the color NeRF MLP may be adjusted using backpropagation to minimize the value of the loss function, as is known.

The foregoing training may be performed in three stages: a first stage for independently training the geometric NeRF MLP, a second stage for independently training the color NeRF MLP, and a third stage for jointly training the geometric NeRF MLP and the color NeRF MLP. The computer 102 may perform the first stage for training the geometric NeRF MLP before the second stage for training the color NeRF MLP because the geometric NeRF MLP is used for rendering the camera ray 204 and the color NeRF MLP is not used for rendering the lidar ray 204. The first stage independently trains the geometric NeRF MLP in that the color NeRF MLP is not updated during the first stage. The computer 102 may freeze the weights of the geometric NeRF MLP during the second stage, i.e., while independently training the color NeRF MLP, in order to ensure that the training of the color NeRF MLP is independent. The computer 102 may perform the first and second stages for independent training before the third stage for joint training so that the third stage operates to fine-tune the geometric NeRF MLP and the color NeRF MLP. The computer 102 may perform each stage for a preset number of iterations chosen to balance processing time and convergence, e.g., 2,500 iterations with a batch size of 1,024 lidar rays 204 for the first stage, 2,500 iterations with a batch size of 1,024 camera rays 204 for the second stage, and 10,000 iterations with a batch size of 1,024 lidar rays 204 and 1,024 camera rays 204 for the third stage.

With reference to FIG. 5, the computer 102 may be programmed to update the occupancy grid map 200, e.g., using stochastic gradient descent, based on the lidar data. Stochastic gradient descent is an iterative optimization procedure that involves, at each iteration, moving in the opposite direction as the gradient of a function at a current point to arrive at the point for the next iteration, with the gradient estimated from a sample of data indicating the function. To perform the stochastic gradient descent, the computer 102 first samples occupancy values $\beta_j$ from the occupancy grid map 200 along a ray 204. The update calculations below may use log-odds values of the occupancy values. The log-odds $l_k$ of the occupancy value $p_k$ is defined as $\log(p_k/(1-p_k))$. The computer 102 may sample both uniformly along the ray 204 and perform importance sampling along the ray 204. For example, the computer 102 may sample occupancy values for half the points of the sample along the ray 204, and use the sampled occupancy values to perform importance sampling for the other half of the points of the sample, in the same manner as described above.

The occupancy grid map 200 may store occupancy values $\gamma_i$ in a uniform grid pattern of the grid points 202. The sampled occupancy values $\beta_j$ may be taken from intermediate positions 502 between the occupancy values $\gamma_i$. To sample occupancy values $\beta_j$ at the intermediate positions 502 between the grid points 202 $\gamma_i$ of the occupancy grid map 200, the computer 102 may use trilinear interpolation of the nearest grid points 202 of the occupancy grid map 200, as illustrated in FIG. 5.

Figure 6:
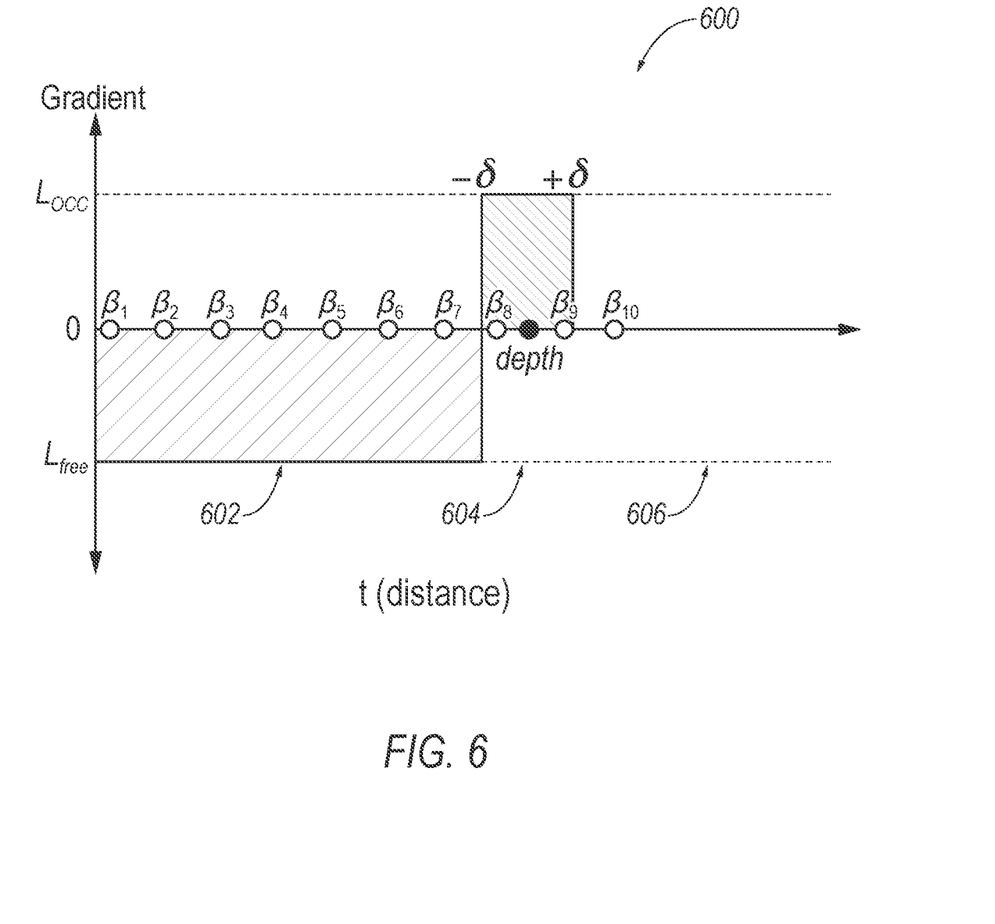
FIG. 6 is a plot of stochastic gradient ascent applied to sample points along the ray.

With reference to FIG. 6, the computer 102 may perform the stochastic gradient descent using the sampled occupancy values $\beta_j$. For example, the computer 102 may increase the occupancy values near a depth measurement from the lidar data, e.g., increase the occupancy values within a parameter distance from the depth measurement. The computer may also decrease the occupancy values closer to the lidar 106 than the depth measurement minus the parameter distance, and keep the occupancy values constant farther from the lidar 106 than the depth measurement plus the parameter distance, e.g., as given in the following expression:

$$\frac{\partial \mathcal{L}_{OGM}}{\partial l_\beta} = g(\beta_j, z_n) = l_{free}\mathcal{U}((z_n - \delta) - \beta_j) - l_{occ}\mathcal{U}(\beta_j - (z_n - \delta))\mathcal{U}((z_n + \delta) - \beta_j)$$

in which $\mathcal{L}_{OGM}$ is a loss function for the occupancy grid map 200, $l_\beta$ is log-odds of the sampled occupancy from the occupancy grid map 200, g( ) is a function giving the gradient descent, $\beta_j$ is the jth sample of the occupancy from the occupancy grid map 200, $z_n$ is the depth measurement from the lidar data, $l_{free}$ is the amount by which the log-odds of occupancy is decreased, $\mathcal{U}($ ) is the Heaviside step function, $\delta$ is the parameter distance, and $l_{occ}$ is the amount by which the log-odds of occupancy is increased. The expression uses the log-odds of the sampled occupancy rather than the sampled occupancy directly. The function g( ) defines the gradient descent even though the loss function $\mathcal{L}_{OGM}$ may be unknown. The amounts $l_{free}$, $l_{occ}$ of gradient descent and the parameter distance $\delta$ may be chosen to balance fast convergence with accurate detection of local maxima. The Heaviside step function $\mathcal{U}($ ) returns 1 for positive arguments and 0 for nonpositive arguments. FIG. 6 plots the above expression versus distance along the ray 204. The plot 600 includes a first region 602 closer to the lidar 106 than the depth measurement $z_n$ minus the parameter distance $\delta$ in which the log-odds of the occupancy value is decreased by the negative amount $l_{free}$ of gradient descent, a second region 604 within the parameter distance $\delta$ from the depth measurement $z_n$ in which the log-odds of the occupancy value is increased by the positive amount $l_{occ}$ of gradient descent, and a third region 606 farther from the lidar 106 than the depth measurement $z_n$ plus the parameter distance $\delta$ in which the log-odds of the occupancy value is unchanged.

The computer 102 may be programmed to update the occupancy grid map 200 concurrently with training the geometric NeRF MLP and/or the color NeRF MLP. For example, the computer 102 may update the occupancy grid map 200 concurrently with independently training the geometric NeRF MLP in the first stage and concurrently with jointly training the geometric NeRF MLP and the color NeRF MLP in the third stage. The computer 102 may, during the independent training and joint training, update the geometric NeRF MLP and/or the color NeRF MLP multiple times for each update of the occupancy grid map 200, e.g., one update of the occupancy grid map 200 every ten iterations of training the geometric NeRF MLP and/or the color NeRF MLP. The multiple updates of the geometric NeRF MLP and/or color NeRF MLP for each update of the occupancy grid map 200 can accommodate the finer level of detail in the geometric NeRF MLP and/or color NeRF MLP compared to the occupancy grid map 200.

The computer 102 may be programmed to, after training the geometric NeRF MLP, generate a synthetic point cloud from a different perspective than the lidar 106 using the geometric NeRF MLP. For example, the computer 102 may receive an input three-dimensional position and an input viewing direction, generate a plurality of viewing directions extending in vertical and horizontal ranges around the input viewing direction, and calculate a plurality of termination depths from the input position and respective viewing directions in the manner described above. Each termination depth is one point in the synthetic point cloud.

The computer 102 may be programmed to, after training the color NeRF MLP, generate a synthetic image from a different perspective than the camera 104 using the color NeRF MLP. For example, the computer 102 may receive an input three-dimensional position and an input viewing direction, generate a plurality of viewing directions extending in vertical and horizontal ranges around the input viewing direction, and calculate a plurality of color vectors from the input position and respective viewing directions in the manner described above. Each color vector is one pixel in the synthetic image.

Figure 7A:
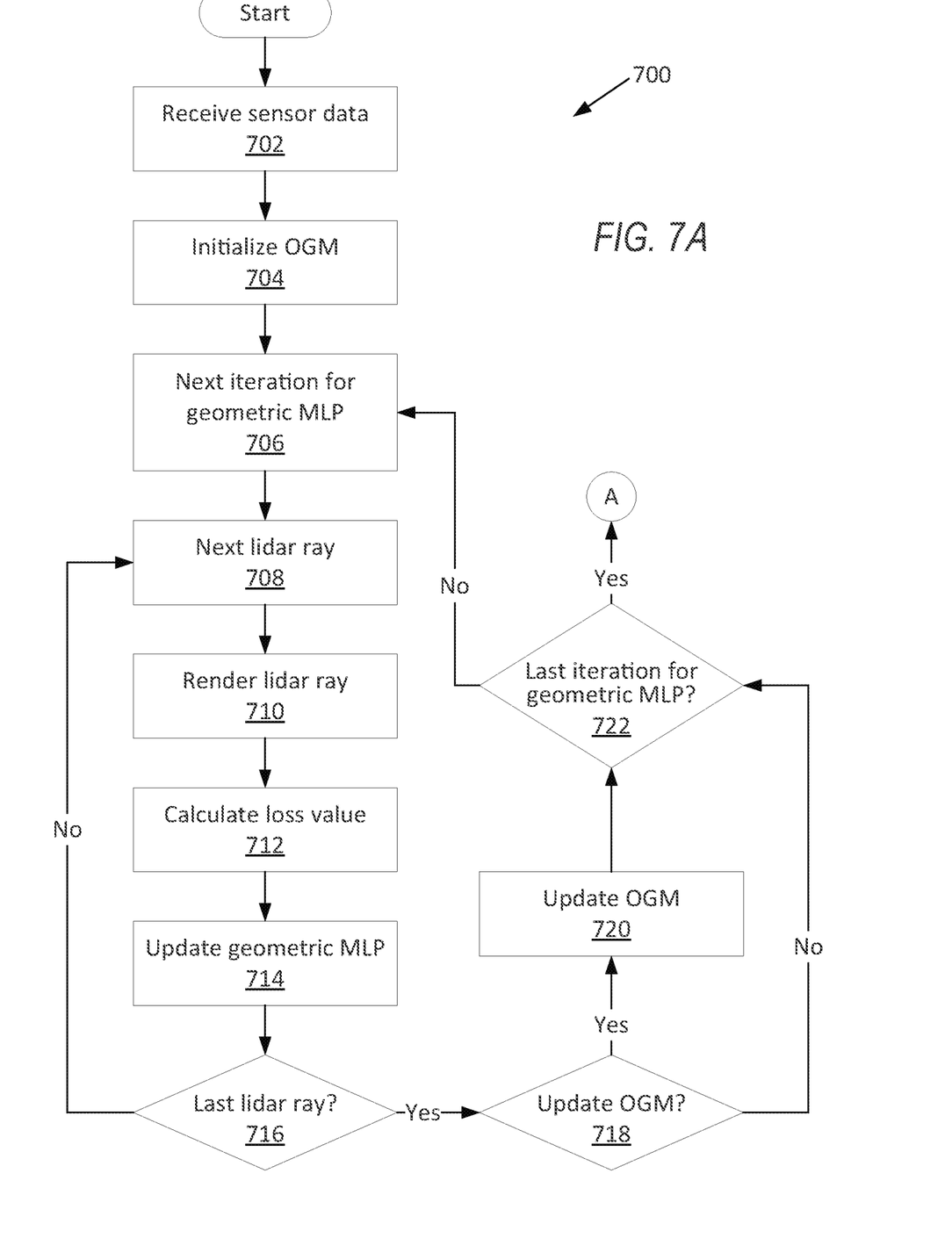
FIGS. 7A-C are collectively a flowchart for training a geometric multilayer perceptron, a color multilayer perceptron, and the occupancy grid.
Figure 7B:
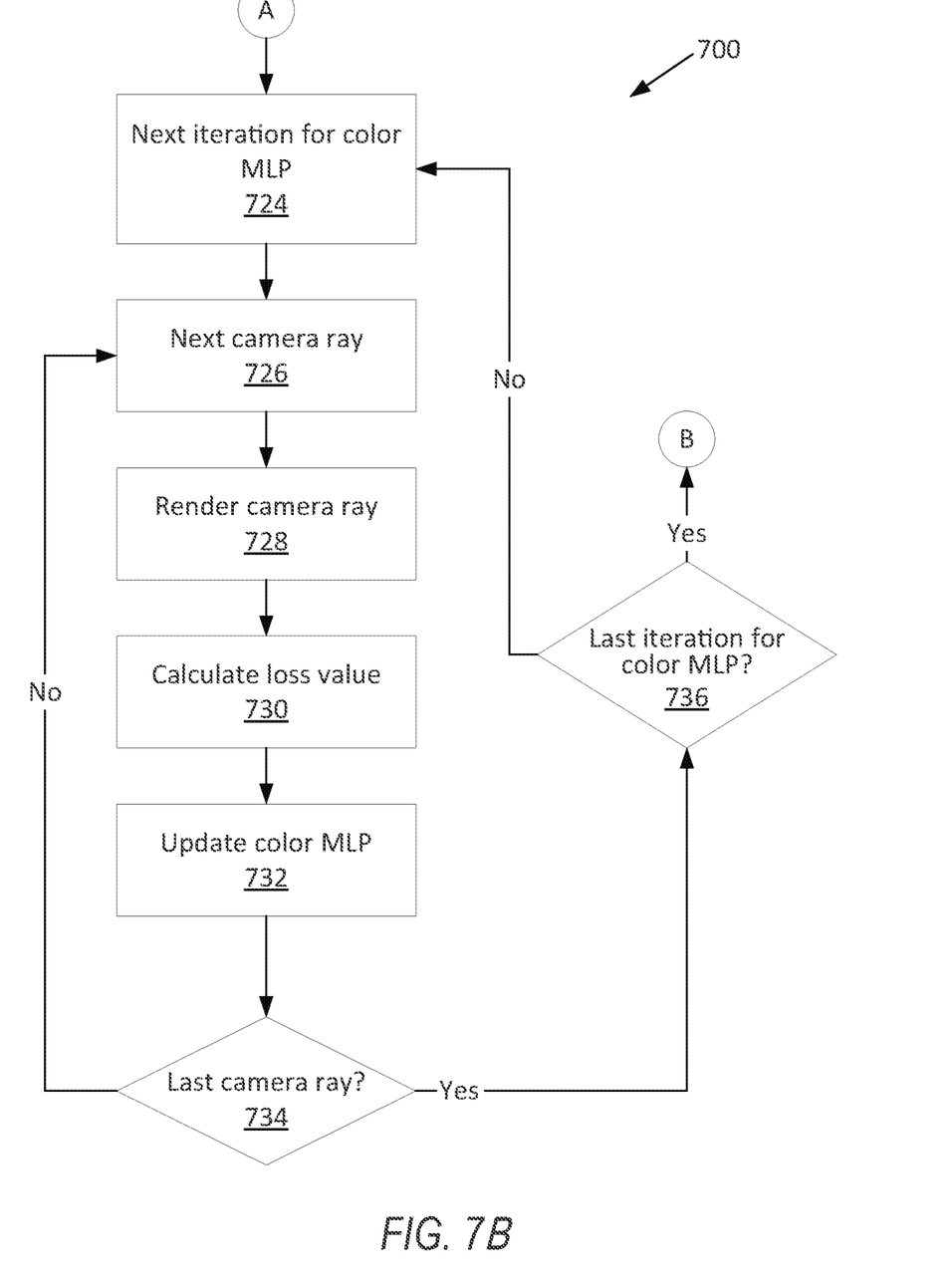
Figure 7C:
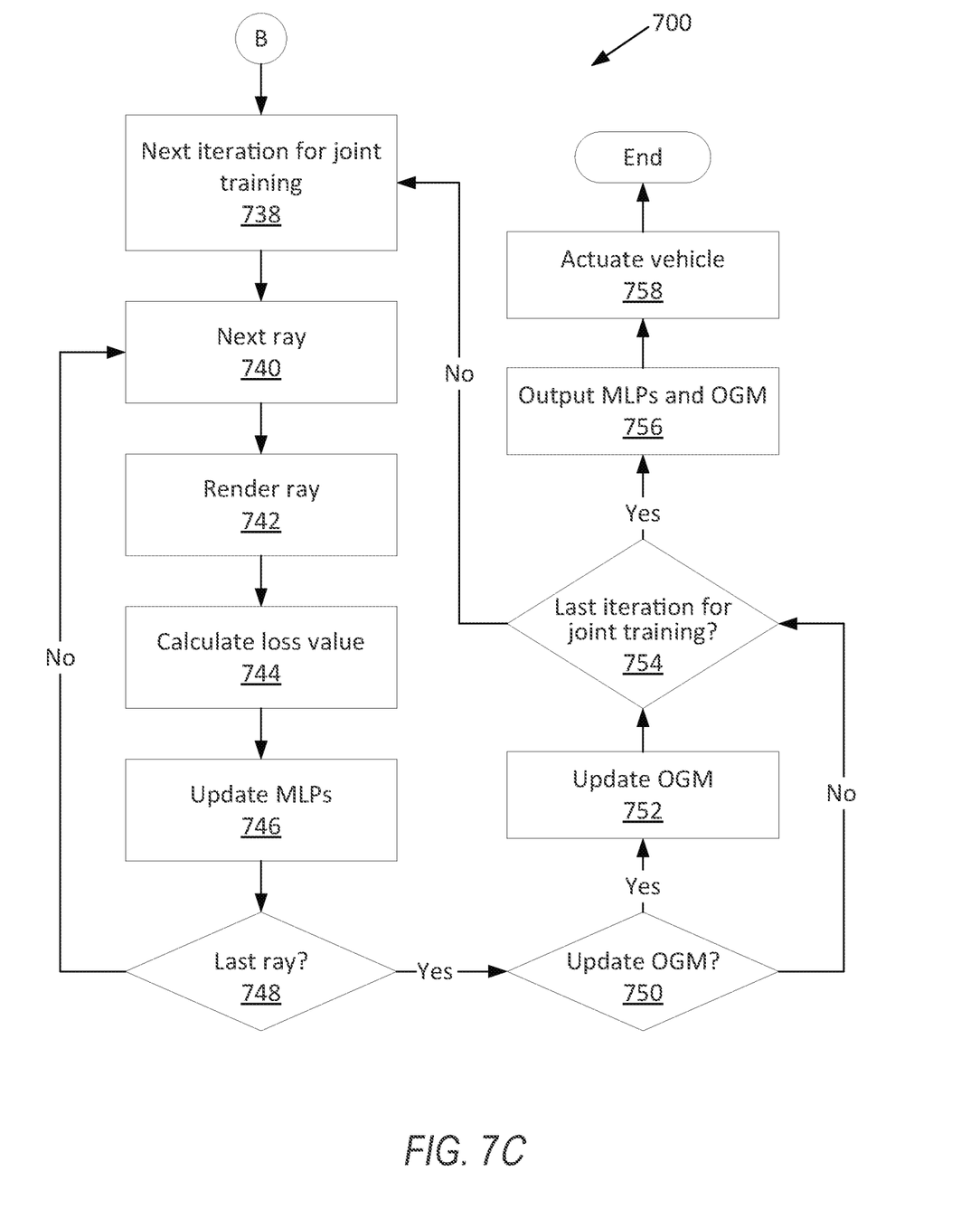

FIGS. 7A-C are collectively a flowchart illustrating an example process 700 for training the geometric NeRF MLP, the color NeRF MLP, and the occupancy grid map 200. The memory of the computer 102 stores executable instructions for performing the steps of the process 700 and/or programming can be implemented in structures such as mentioned above. The process 700 may begin in response to the vehicle 100 turning on or being shifted out of park into a driving gear. As a general overview of the process 700, the computer 102 receives data from the lidar 106 and the camera 104 and initializes the occupancy grid map 200. The computer 102 independently trains the geometric NeRF MLP for a preset number of iterations. For each lidar ray 204 in each iteration, the computer 102 renders the lidar ray 204, calculates the value of the loss function, and updates the weights of the geometric NeRF MLP. At each preset multiple number of iterations, the computer 102 updates the occupancy grid map 200. Then the computer 102 independently trains the color NeRF MLP for a preset number of iterations. For each camera ray 204 in each iteration, the computer 102 renders the camera ray 204, calculates the value of the loss function, and updates the weights of the color NeRF MLP. Then the computer 102 jointly trains the geometric NeRF MLP and the color NeRF MLP for a preset number of iterations. For each lidar ray 204 and for each camera ray 204 in each iteration, the computer 102 renders the ray 204, calculates the value of the loss function, and updates the weights of the geometric NeRF MLP and the color NeRF MLP. At each preset multiple number of iterations, the computer 102 updates the occupancy grid map 200. Then the computer 102 outputs the trained geometric NeRF MLP, color NeRF MLP, and occupancy grid map 200. Finally, the computer 102 actuates a component of the vehicle 100 based on the trained geometric NeRF MLP, color NeRF MLP, and occupancy grid map 200.

The process 700 begins in a block 702 (shown in FIG. 7A), in which the computer 102 receives the lidar data from the lidar 106 and the camera data from the camera 104, as described above.

Next, in a block 704, the computer 102 initializes the occupancy grid map 200, as described above.

Next, in a block 706, the computer 102 moves to a next iteration of the independent training of the geometric NeRF MLP, i.e., a next iteration of the first stage of the training, starting at a first iteration. The computer 102 may store an index number of the current iteration and increment the index number by one.

Next, in a block 708, the computer 102 moves to a next lidar ray 204 of a batch of lidar rays 204 for the current iteration, starting with a first lidar ray 204. The computer 102 may store an index number of the current lidar ray 204 and increment the index number by one.

Next, in a block 710, the computer 102 renders the current lidar ray 204 by executing the geometric NeRF MLP, as described above.

Next, in a block 712, the computer 102 calculates a value of the loss function for the current lidar ray 204, as described above.

Next, in a block 714, the computer 102 updates the weights of the geometric NeRF MLP based on the value of the loss function, e.g., using backpropagation, as described above.

Next, in a decision block 716, the computer 102 determines whether the current lidar ray 204 is the final lidar ray 204 of the batch for the current iteration. For example, the computer 102 may check whether an index of the current lidar ray 204 equals the total number of lidar rays 204 in each batch, e.g., 1,024. In response to the current lidar ray 204 being before the final lidar ray 204, the process 700 returns to the block 708 to proceed to the next lidar ray 204 in the batch. In response to reaching the final lidar ray 204 of the batch, the process 700 proceeds to a decision block 718.

In the decision block 718, the computer 102 determines whether to update the occupancy grid map 200. For example, the computer 102 may check whether an index of the current iteration is evenly divisible by the number of iterations per update of the occupancy grid map 200, e.g., 10. Upon determining to update the occupancy grid map 200, the process 700 proceeds to a block 720. Upon determining not to update the occupancy grid map 200, the process 700 proceeds to a decision block 722.

In the block 720, the computer 102 updates the occupancy grid map 200, e.g., using stochastic gradient descent, as described above. After the block 720, the process 700 proceeds to the decision block 722.

In the decision block 722, the computer 102 determines whether the current iteration is the final iteration of the first stage. For example, the computer 102 may check whether the index of the current iteration equals the total number of iterations in the first stage, e.g., 2,500. In response to the current iteration being before the final iteration, the process 700 returns to the block 706 to proceed to the next iteration.

In response to reaching the final iteration, the process 700 proceeds to a block 724 (shown in FIG. 7B).

In the block 724, the computer 102 moves to a next iteration of the independent training of the color NeRF MLP, i.e., a next iteration of the second stage of the training, starting at a first iteration. The computer 102 may store an index number of the current iteration and increment the index number by one.

Next, in a block 726, the computer 102 moves to a next camera ray 204 of a batch of camera rays 204 for the current iteration, starting with a first camera ray 204. The computer 102 may store an index number of the current camera ray 204 and increment the index number by one.

Next, in a block 728, the computer 102 renders the current camera ray 204 by executing the color NeRF MLP, as described above.

Next, in a block 730, the computer 102 calculates a value of the loss function for the current camera ray 204, as described above.

Next, in a block 732, the computer 102 updates the weights of the color NeRF MLP based on the value of the loss function, e.g., using backpropagation, as described above.

Next, in a decision block 734, the computer 102 determines whether the current camera ray 204 is the final camera ray 204 of the batch for the current iteration. For example, the computer 102 may check whether an index of the current camera ray 204 equals the total number of camera rays 204 in each batch, e.g., 1,024. In response to the current camera ray 204 being before the final camera ray 204, the process 700 returns to the block 726 to proceed to the next camera ray 204 in the batch. In response to reaching the final camera ray 204 of the batch, the process 700 proceeds to a decision block 736.

In the decision block 736, the computer 102 determines whether the current iteration is the final iteration of the second stage. For example, the computer 102 may check whether the index of the current iteration equals the total number of iterations in the second stage, e.g., 2,500. In response to the current iteration being before the final iteration, the process 700 returns to the block 724 to proceed to the next iteration. In response to reaching the final iteration, the process 700 proceeds to a block 738 (shown in FIG. 7C).

In the block 738, the computer 102 moves to a next iteration of the joint training of the geometric NeRF MLP and the color NeRF MLP, i.e., a next iteration of the third stage of the training, starting at a first iteration. The computer 102 may store an index number of the current iteration and increment the index number by one.

Next, in a block 740, the computer 102 moves to a next ray 204 of a batch of lidar rays 204 and camera rays 204 for the current iteration, starting with a first ray 204. The computer 102 may store an index number of the current ray 204 and increment the index number by one. A first half of the index numbers may correspond to the lidar rays 204, and a second half of the index numbers may correspond to the camera rays 204.

Next, in a block 742, the computer 102 renders the current ray 204 by executing the geometric NeRF MLP if the current ray 204 is a lidar ray 204 or by executing the color NeRF MLP if the current ray 204 is a camera ray 204, as described above.

Next, in a block 744, the computer 102 calculates a value of the loss function for the current ray 204, as described above.

Next, in a block 746, the computer 102 updates the weights of the geometric NeRF MLP based on the value of the loss function if the current ray 204 is a lidar ray 204, and the computer 102 updates the weights of the color NeRF MLP based on the value of the loss function if the current ray 204 is either a camera ray 204 or a lidar ray 204, as described above.

Next, in a decision block 748, the computer 102 determines whether the current ray 204 is the final ray 204 of the batch for the current iteration. For example, the computer 102 may check whether an index of the current ray 204 equals the total number of rays 204 in each batch, e.g., 2,048. In response to the current ray 204 being before the final ray 204, the process 700 returns to the block 740 to proceed to the next ray 204 in the batch. In response to reaching the final ray 204 of the batch, the process 700 proceeds to a decision block 750.

In the decision block 750, the computer 102 determines whether to update the occupancy grid map 200. For example, the computer 102 may check whether an index of the current iteration is evenly divisible by the number of iterations per update of the occupancy grid map 200, e.g., 10. Upon determining to update the occupancy grid map 200, the process 700 proceeds to a block 752. Upon determining not to update the occupancy grid map 200, the process 700 proceeds to a decision block 754.

In the block 752, the computer 102 updates the occupancy grid map 200, e.g., using stochastic gradient descent, as described above. After the block 752, the process 700 proceeds to the decision block 754.

In the decision block 754, the computer 102 determines whether the current iteration is the final iteration of the third stage. For example, the computer 102 may check whether the index of the current iteration equals the total number of iterations in the third stage, e.g., 10,000. In response to the current iteration being before the final iteration, the process 700 returns to the block 738 to proceed to the next iteration. In response to reaching the final iteration, the process 700 proceeds to a block 756.

In the block 756, the computer 102 outputs the fully trained geometric NeRF MLP, color NeRF MLP, and occupancy grid map 200, e.g., to the memory of the computer 102 for use in generating synthetic point clouds and/or synthetic images, or for use in actuating a component of the vehicle 100.

Next, in a block 758, the computer 102 actuates a component of the vehicle 100 based on at least one of the geometric NeRF MLP, color NeRF MLP, or occupancy grid map 200. For example, the computer 102 may actuate one or more of the propulsion system 110, brake system 112, steering system 114, or user interface 116. For example, the computer 102 may actuate the component in executing an advanced driver assistance system (ADAS). ADAS are electronic technologies that assist drivers in driving and parking functions. Examples of ADAS include forward collision detection, lane-departure detection, blind-spot detection, automatic braking, adaptive cruise control, and lane-keeping assistance. The computer 102 may actuate the brake system 112 to stop the vehicle 100 before reaching an object in the environment as indicated by the occupancy grid map 200, according to an automatic braking algorithm. The computer 102 may actuate the user interface 116 to output a message to the operator indicating an object indicated by the occupancy grid map 200, according to a forward collision detection algorithm. The computer 102 may operate the vehicle 100 autonomously, i.e., actuating the propulsion system 110, the brake system 112, and the steering system 114 based on the geometric NeRF MLP, color NeRF MLP, and/or occupancy grid map 200. The computer 102 may execute a path-planning algorithm to navigate the vehicle 100 around objects in the environment using the occupancy grid map 200 and synthetic point clouds and/or synthetic images at possible future points on the planned path. After the block 758, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   jointly train a geometric neural radiance field (NeRF) multilayer perceptron (MLP) and a color NeRF MLP to model a scene using an occupancy grid map, camera data of the scene from a camera, and lidar data of the scene from a lidar, the geometric NeRF MLP and the color NeRF MLP being distinct from each other, the geometric NeRF MLP being a neural radiance field modeling a geometry of the scene, and the color NeRF MLP being a neural radiance field modeling colors of the scene;
   supervise the geometric NeRF MLP with the lidar data during the joint training; and
   supervise the color NeRF MLP with the camera data during the joint training.

2. The computer of claim 1, wherein the instructions further include instructions to, after the joint training, actuate a component based on at least one of the occupancy grid map, the geometric NeRF MLP, or the color NeRF MLP.

3. The computer of claim 1, wherein the instructions further include instructions to sample occupancy of the occupancy grid map at points along a ray extending from the camera or lidar.

4. The computer of claim 3, wherein the instructions further include instructions to sample the occupancy at the points by interpolating from occupancy values at nearby grid points of the occupancy grid map.

5. The computer of claim 3, wherein the points are first points, the first points are evenly spaced along the ray, and the instructions further include instructions to perform importance sampling of occupancy of the occupancy grid map at second points along the ray.

6. The computer of claim 5, wherein the instructions further include instructions to execute at least one of the geometric NeRF MLP or the color NeRF MLP with positions of the second points as an input.

7. The computer of claim 1, wherein the instructions further include instructions to render at least one of a lidar ray extending from the lidar by executing the geometric NeRF MLP or a camera ray extending from the camera by executing the color NeRF MLP.

8. The computer of claim 1, wherein the instructions further include instructions to update the geometric NeRF MLP based on a loss function.

9. The computer of claim 8, wherein the loss function includes an opacity loss based on an opacity along a ray extending from the lidar.

10. The computer of claim 8, wherein the loss function includes a line-of-sight loss along a ray extending from the lidar.

11. The computer of claim 10, wherein the loss function includes an opacity loss based on an opacity along the ray, and the line-of-sight loss is weighted more strongly in the loss function than the opacity loss is.

12. The computer of claim 1, wherein the instructions further include instructions to update the color NeRF MLP based on a loss function.

13. The computer of claim 12, wherein the loss function includes an opacity loss based on an opacity along a ray extending from the camera.

14. The computer of claim 12, wherein the loss function includes a color loss along a ray extending from the camera.

15. The computer of claim 1, wherein the instructions further include instructions to update the occupancy grid map using stochastic gradient descent based on the lidar data.

16. The computer of claim 1, wherein the instructions further include instructions to update the occupancy grid map concurrently with training the geometric NeRF MLP and color NeRF MLP.

17. The computer of claim 1, wherein the instructions further include instructions to update the occupancy grid map, and, during the joint training, update the geometric NeRF MLP or the color NeRF MLP multiple times for each update of the occupancy grid map.

18. The computer of claim 1, wherein the instructions further include instructions to, before jointly training the geometric NeRF MLP and the color NeRF MLP, train the geometric NeRF MLP independent of the color NeRF MLP.

19. The computer of claim 1, wherein the instructions further include instructions to, before jointly training the geometric NeRF MLP and the color NeRF MLP, train the color NeRF MLP independent of the geometric NeRF MLP.

20. A method comprising:
jointly training a geometric neural radiance field (NeRF) multilayer perceptron (MLP) and a color NeRF MLP to model a scene using an occupancy grid map, camera data of the scene from a camera, and lidar data of the scene from a lidar, the geometric NeRF MLP and the color NeRF MLP being distinct from each other, the geometric NeRF MLP being a neural radiance field modeling a geometry of the scene, and the color NeRF MLP being a neural radiance field modeling colors of the scene;
supervising the geometric NeRF MLP with the lidar data during the joint training; and
supervising the color NeRF MLP with the camera data during the joint training.

* * * * *